US009285091B2

(12) United States Patent
Danner et al.

(10) Patent No.: US 9,285,091 B2
(45) Date of Patent: Mar. 15, 2016

(54) LED LIGHT MODULE

(75) Inventors: Markus Danner, Ollersdorf (AT);
Andreas Moser, Haag (AT); Johannes Jungwirth, Ferschnitz (AT); Gunther Krenn, Boheimkirchen (AT); Martin Stein, Wolfpassing (AT)

(73) Assignee: ZIZALA LIGHTSYSTEME GMBH, Wieselburg (AT)

( * ) Notice: Subject to any disclaimer, the term of this patent is extended or adjusted under 35 U.S.C. 154(b) by 0 days.

(21) Appl. No.: 13/883,721

(22) PCT Filed: Nov. 17, 2011

(86) PCT No.: PCT/AT2011/050031
§ 371 (c)(1),
(2), (4) Date: May 6, 2013

(87) PCT Pub. No.: WO2012/083331
PCT Pub. Date: Jun. 28, 2012

(65) Prior Publication Data
US 2013/0223089 A1 Aug. 29, 2013

(30) Foreign Application Priority Data

Dec. 22, 2010 (AT) .................................... 2109/2010

(51) Int. Cl.
*F21S 8/10* (2006.01)

(52) U.S. Cl.
CPC ......... *F21S 48/1241* (2013.01); *F21S 48/1154* (2013.01); *F21S 48/1266* (2013.01); *B60Q 2400/30* (2013.01)

(58) Field of Classification Search
CPC ............. F21S 48/1258; F21S 48/1241; F21S 48/1225; F21S 48/1329; F21S 48/225; G02B 1/045; G02B 6/002
USPC ................. 359/642, 708–712, 720, 726, 796; 362/459–549
See application file for complete search history.

(56) References Cited

U.S. PATENT DOCUMENTS 5,526,190 A * 6/1996 Hubble et al. ................ 359/719
6,530,683 B1 * 3/2003 Ohkohdo et al. ............. 362/511
(Continued)

*Primary Examiner* — Evan Dzierzynski
*Assistant Examiner* — Christopher E Dunay
(74) *Attorney, Agent, or Firm* — Sutherland Asbill & Brennan LLP

(57) ABSTRACT

The invention relates to a vehicle headlamp (1) for producing a main light distribution and an auxiliary light distribution, wherein the vehicle headlamp (1) comprises two or more LED light modules (10), wherein each of the LED light modules (10) comprises one or more primary LED light sources (11), wherein a primary LED light source (11') comprises at least one light-emitting diode, comprises two or more secondary LED light sources (12, 12a), wherein a secondary LED light source (12, 12a) comprises at least one light-emitting diode (12'), and comprises a lens (13), wherein the light emitted by the at least one primary LED light source (11) is radiated directly onto the lens (13) and projected by the lens into the exterior space, wherein the light emitted by the primary LED light sources (11) of a all LED modules (10) forms the main light distribution, and wherein the light emitted by the secondary LED light sources (12, 12a) of an LED modules (10) is radiated onto the lens (13) of the LED module (10) by means of an optical waveguide (14), which lens (13) projects the light into the exterior space, and wherein the light emitted by the secondary LED light sources (12, 12a) of all LED modules (10) forms the auxiliary light distribution, wherein preferably at least one of the secondary LED light sources (12a) shines directly through the optical waveguide (14) in order to achieve a homogeneous light distribution contribution to the auxiliary light distribution, and wherein light is coupled by at least one of the secondary LED light sources (12) into the optical waveguide (14) via at least one light incoupling point (140) and exits directed substantially parallel via at least one light decoupling point (141) in order to produce a maximum contribution to the auxiliary light distribution.

33 Claims, 8 Drawing Sheets

(56) References Cited

U.S. PATENT DOCUMENTS

| | | | |
|---|---|---|---|
| 7,258,473 B2* | 8/2007 | Okamura et al. | 362/545 |
| 7,290,906 B2* | 11/2007 | Suzuki et al. | 362/511 |
| 7,411,742 B1* | 8/2008 | Kim et al. | 359/718 |
| 7,438,454 B2* | 10/2008 | Chinniah et al. | 362/500 |
| 7,520,650 B2* | 4/2009 | Smith | 362/555 |
| 7,580,192 B1* | 8/2009 | Chu et al. | 359/641 |
| 7,922,375 B2* | 4/2011 | Tatsukawa | 362/516 |
| 7,963,680 B2* | 6/2011 | Yoon et al. | 362/336 |
| 8,469,565 B2* | 6/2013 | Yatsuda | 362/522 |
| 8,506,129 B2* | 8/2013 | Okada | 362/299 |
| 2004/0012976 A1* | 1/2004 | Amano | 362/511 |
| 2005/0152141 A1* | 7/2005 | Suzuki | B60Q 1/0052 362/241 |
| 2007/0041098 A1* | 2/2007 | Kim et al. | 359/642 |
| 2007/0268715 A1* | 11/2007 | De Lamberterie | 362/514 |
| 2008/0062709 A1* | 3/2008 | Mochizuki et al. | 362/539 |
| 2008/0080199 A1* | 4/2008 | Sassoon | B60Q 1/0052 362/487 |
| 2008/0089080 A1* | 4/2008 | Kawaji et al. | 362/494 |
| 2009/0027910 A1* | 1/2009 | Nagasawa et al. | 362/518 |
| 2009/0154186 A1* | 6/2009 | Natsume et al. | 362/516 |
| 2010/0053987 A1* | 3/2010 | Nakabayashi | 362/538 |
| 2013/0314925 A1* | 11/2013 | Jiang et al. | 362/311.02 |
| 2014/0003075 A1* | 1/2014 | Yamada et al. | 362/511 |

* cited by examiner

LED LIGHT MODULE

CROSS-REFERENCE TO RELATED APPLICATIONS

This application is the national stage of International Application No. PCT/AT2011/050031, filed Nov. 17, 2011, and claims priority benefit of Austrian Patent Application No. A 2109/2010, filed Dec. 22, 2010. These applications are incorporated by reference herein.

The invention relates to a vehicle headlight for creating a primary light distribution and an auxiliary light distribution, wherein the vehicle headline comprises two or more LED light modules.

It is known to compose a vehicle headlight from a number of light modules, in particular LED light modules, which during operation, this being with the light modules illuminated, lending the headlight a characteristic appearance in keeping with the arrangement of the light modules.

This characteristic appearance generates a high recognition factor for the different automobile brands.

In addition to the primary light function, for example a low-beam light function, such a headlight can now be used to create an auxiliary light function, such as daytime running lights. For this purpose, it is generally necessary to have other light modules switched on, or to have fewer light modules switched on than for the primary light function, so that the characteristic appearance of the headlight is no longer given when the auxiliary light function is activated.

It is an object of the invention to create a vehicle headlight that has the same visual appearance, both when the primary light function is activated and when the auxiliary light function is activated.

This object is achieved by a headlight described at the beginning in that, according to the invention, each of the LED light modules comprises one or more primary LED light sources, wherein a primary LED light source comprises at least one light-emitting diode, and two or more secondary LED light sources, wherein a secondary LED light source comprises at least one light-emitting diode, and a lens, wherein the light emitted by the at least one primary LED light source is radiated directly onto the lens and projected by the same into the exterior space, wherein the light emitted by the primary LED light sources of all LED modules forms the primary light distribution, and wherein the light emitted by the secondary LED light sources of an LED module is radiated onto the lens of the LED module by way of an optical waveguide, the lens projecting the light into the exterior space, and wherein the light emitted by the secondary LED light sources of all LED modules forms the auxiliary light distribution, wherein light is coupled by at least one of the secondary LED light sources into the optical waveguide via at least one light incoupling point and exits, preferably directed substantially parallel, via at least one light outcoupling point, preferably so as to produce a maximum contribution to the auxiliary light distribution.

The invention allows the above object to be achieved using a simple design. A primary light distribution is formed with the primary LED light source, and the auxiliary light distribution is formed with the secondary LED light source or sources, wherein the respective light distribution is created by way of the lenses of the light modules.

It is possible in this way for the light modules to differ from each other only with respect to the lens, while the number and arrangement of the LED light sources themselves and of the optical waveguides employed are identical.

So as to be able to generate the light distributions by way of the lens in an optically optimal manner, it is necessary for the light exit area for the primary light function and that for the secondary light function to be located as close as possible to or in the focal plane of the lens or to extend in keeping with the field of curvature of the lens. Because of the design according to the invention, where the primary light is directly radiated onto the lens, while the secondary light is radiated by way of an optical waveguide, this design can be implemented in a simple manner.

Thus, all light modules can be switched on and illuminated both with the primary light function and the auxiliary light function, whereby the same appearance of the headlight is achieved for both functions.

So as to be able to implement a central maximum in the auxiliary light distribution in a simple manner, according to the invention the at least one light outcoupling region is arranged in a central region of the optical waveguide.

In particular this at least one light outcoupling region is located along a horizontal section through the optical waveguide—and more particularly as seen looking in a direction transversely relative to the light exit direction—in the center of the horizontal section.

To this end, horizontal refers to the state in which the headlight is installed in the vehicle.

In addition, according to the invention advantageously the at least one light incoupling point of the optical waveguide for coupling in light of the at least one secondary LED light source is provided in an outer region of the optical waveguide.

Additionally, advantageously at least one of the secondary LED light sources shines directly through the optical waveguide, wherein the at least one secondary LED light source, the light of which passes directly through the optical waveguide, is advantageously arranged between the at least one light incoupling point and the at least one light outcoupling point.

This is used to achieve a homogeneous light distribution contribution to the auxiliary light distribution, however primarily so as to allow a seamless transition, both in the light pattern and in the appearance of the light module, from the secondary LED light sources coupling light into the optical waveguide to the at least one primary LED light source.

Because of the design of primary LED light sources that are typically employed (key word: LED ceramics), the optical waveguide generally does not approach the at least one primary LED light source so closely that a seamless transition can be created between the at least one light-incoupling secondary LED light source and the primary LED light source or sources.

If it is possible to guide the optical waveguide sufficiently closely to the primary LED light source(s), the secondary LED light sources shining directly through the optical waveguide are not absolutely necessary.

In order to obtain sufficient light and/or have a light area that is illuminated as completely as possible, the at least one primary LED light source is operated in dimmed mode in the secondary light operation. As mentioned above, so as to achieve a seamless transition in the light distribution of the auxiliary light to the dimmed primary LED light sources, secondary LED light sources that shine directly through the optical waveguide are disposed adjacent or neighboring to the at least one primary LED light source. For these to be disposed without difficulty at the desired points, the secondary LED light sources that produce the maximum in the light distribution of the auxiliary light are disposed outside, because the light thereof is conducted to the desired point through the optical waveguide anyhow.

According to a specific variant of the invention, exactly two, or at least two, secondary LED light sources are provided for each light module, the light of these LED light sources passing directly through the optical waveguide, and exactly two, or at least two, secondary LED light sources are provided, which couple light into the optical waveguide via at least one light incoupling point, preferably via exactly two light incoupling points, or via a number that corresponds to the number of secondary LED light sources.

In addition, the secondary LED light sources are preferably distributed along the horizontal extension of the optical waveguide and preferably are disposed symmetrically relative to the at least one light outcoupling point.

The term 'horizontal' refers to the installed state in the vehicle, but does not necessarily mean that these light sources are all disposed along one line (horizontal line).

In addition, the optical waveguide also has at least one opening or cut-out for light from the at least one primary LED light source to pass through.

It is thus possible to provide all secondary LED light sources, or in general all LED light sources, on a common LED printed circuit board. In addition, the light distribution of the primary light function is basically not affected by the optical waveguide.

Finally, it is thus also possible to attach the at least one primary LED light source in or close to the focal point of the lens so as to optimally create the primary light distribution.

To this end, the at least one primary LED light source is preferably disposed in the opening or cut-out.

The cut-out and the at least one primary LED light source are preferably matched to each other with precise fit, however the primary LED light source is typically not held or attached in the opening or cut-out.

When a primary LED light source having sufficient luminous intensity is used, it is advantageous to provide exactly one primary LED light source for a simple design.

Additionally, adjacent to the light incoupling point, the optical waveguide has a curved, for example parabolically shaped, section, which directs the coupled-in beams of the at least one secondary LED light source substantially parallel to each other.

To this end, the optical waveguide is advantageously designed to be reflective in the region of the curved section, either in some areas or in the entire curved section.

This is done to increase the efficiency, which is to say losses of light can thus be reduced or entirely prevented. A reflective layer is applied (from the outside) to the section by vapor deposition, for example.

In terms of the design it is also advantageous if an optical waveguide connecting section is provided adjacent to such a curved section of the optical waveguide, this section connecting the curved optical waveguide section to the optical waveguide outcoupling region, wherein the optical waveguide connecting section comprises a delimiting surface that faces away from the secondary LED light sources, the delimiting plane having a planar or curved shape, wherein the curvature is preferably adapted to the field of curvature of the lens.

The delimiting surface facing away forms the light exit area of the optical waveguide.

This results in an illuminated area of the secondary LED light sources, which preferably follows the field of curvature of the lens. In the case of a planar light exit area, the light of the secondary LED light sources passing directly through the optical waveguide will no longer be located entirely in the focal surface or focal line of the lens, and is therefore imaged with slight distortion. However, this plays a subordinate role in the auxiliary light function because the light function does not have a pronounced light/dark line, but primarily has to supply the quantity of light at the measurement points and has to be homogeneous.

The design of an optical waveguide having a curved, preferably parabolic, section, allows conventional LED light sources to be used, because these can then be located in a common plane and accordingly on a common LED printed circuit board. When so-called "side LEDs" are used, which radiate light to the side (and not substantially along the 0° direction), the curved, parabolic section could basically be eliminated and the light could be radiated directly into the light outcoupling region or regions. These side LEDs can then likewise be mounted without difficult on a common LED printed circuit board.

The parallel direction of the beams of such side LEDS can be achieved by way of an appropriately adapted light outcoupling region or, for example, by way of a parabolic reflector, which is disposed between the side LEDs and the optical waveguide.

In the incoupling region, the optical waveguide may also have a parabolic shape, which has the advantage that the optical waveguide thus shaped does not necessarily have to be coated with a reflective layer.

The primary LED light source can be disposed in the cut-out so that the light exit plane thereof is located in the plane of the outer planar or curved delimiting surface of the optical waveguide, wherein the primary LED light source, in particular the one or more light exit areas thereof, is located as exactly as possible in the focal point of the lens.

The delimiting surface of the optical waveguide facing the secondary LED light sources is preferably likewise planar or curved.

In addition, the delimiting surface of the optical waveguide facing the secondary LED light sources and the delimiting surface facing away from the secondary LED light sources are preferably parallel to each other.

In addition, the at least one light outcoupling point is designed so that light from the optical waveguide connecting section is refracted preferably substantially normal relative to the light from the optical waveguide connecting section, for which purpose the at least one light outcoupling point is designed in a stepped or prism shape, for example.

The stepped or prism-shaped configuration of the light outcoupling point(s) causes the beams to be refracted, and the parallel direction of the beams is achieved in the optical waveguide by way of the curved, preferably parabolic, section.

So as to be able to implement the vertical extension of the light from the auxiliary light in the manner required by law, additionally the light exit area of the optical waveguide has a defined extent in terms of the vertical extension thereof, preferably differing defined vertical extensions at differing horizontal points.

In summary, this means that the light exit area, notably in the vertical direction, has a vertical extension (which may vary along the horizontal extension), so that the necessary extension of the light pattern can be achieved in the vertical direction.

To this end, the light exit area is preferably mirror-symmetrical about a vertical axis.

The lenses of the individual light modules are designed for this purpose such that the superposed light patterns of the individual light modules produce the primary light function and/or the auxiliary light function.

To this end, the main focus is typically directed to assuring that the primary light function is optimally created, wherein the general condition is that, of course, the primary and auxiliary light functions must satisfy legal requirements.

The lenses are preferably free-form lenses, these free-form lenses preferably expanding the light pattern of the individual LED light sources downward and in terms of breadth.

So as to achieve symmetrical illumination of the optical waveguide, preferably those secondary LED light sources, the light of which passes directly through the optical waveguide, are located in a common horizontal plane, and those secondary LED light sources that couple light into the optical waveguide via at least one light incoupling point are likewise located in a common horizontal plane, wherein the horizontal plane of those secondary LED light sources, the light of which passes directly through the optical waveguide, is preferably located above the horizontal plane of those secondary LED light sources that couple light into the optical waveguide via at least one light incoupling point.

The vehicle headlight described above allows various primary light and auxiliary light functions to be created. If the primary light distribution, for example in the case of a low-beam light distribution, has to have an asymmetrical component in the light distribution, this is easiest to achieve by providing at least one further light module for generating an asymmetrical component in the primary light distribution.

To this end, the at least one further light module comprises at least one LED light source and at least one lens, wherein the lens is preferably a converging lens. Contrary to the light modules described above, the light must not be distributed to the sides with this light module, because this would destroy the asymmetry (at the light/dark line).

The primary LED light source is typically dimmed or shut off when the auxiliary light distribution is activated. Dimming has the advantage that an area is attained that is consistently illuminated and not dark in the region of the cut-out.

In addition, according to the invention the primary LED light source is switched on and the secondary LED light source(s) are switched off when the primary light distribution is activated.

However it is also conceivable for the auxiliary light function (e.g. daytime running lights) to be likewise in operation in the case of primary light function=high-beam light, so that more light is available. Or in the case of primary light function=low-beam light, only those light-emitting diodes of the secondary LED light source(s) could be illuminated which emit light below the light/dark line.

For example, the primary light distribution is a dimmed light distribution, such as a low-beam light distribution, fog light or highway light (such as according to ECE regulation R 123), and the auxiliary light distribution is a daytime running light distribution.

Based on free-form lenses, a variety of light distributions can be formed, which in the superposition thereof satisfy the legal requirements (SAE, ECE, and the like) in terms of the respective light function.

By using an optical waveguide, no special arrangement of the LED light sources is required to attain the desired light distributions.

The invention will be described in more detail hereafter based on the drawings. In the drawings:

FIG. 1 and FIG. 2 show an exemplary headlight 1, which is designed to create a light function of the primary light in the form of a low-beam light and a light function of an auxiliary light in the form of daytime running lights.

Figure 1:
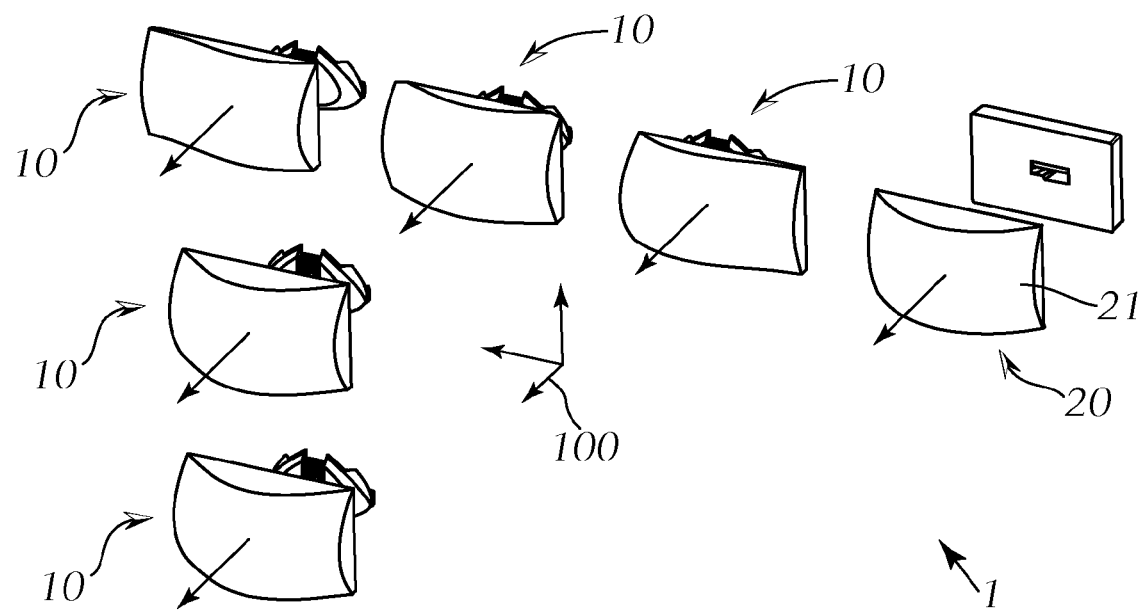
FIG. 1 shows a schematic illustration of an oblique front view of an exemplary headlight, composed of six light modules.

The headlight 1 is composed of five light modules 10, which are identically constructed in terms of the arrangement of the LED light sources, and a respective free-form lens 13 for each light module 10, wherein the lenses 13 differ in terms of the detail hereof, as will be described hereafter.

These five light modules 10 form a characteristic arrangement, which creates the characteristic appearance of the headlight.

Yet another light module 20 is provided so as to create the asymmetrical component in the low-beam light distribution. The light module 20 comprises a plurality of LED light sources 22, 24, wherein the LED light source 24 is used to produce a contribution to a primary light distribution (for example low-beam light) and the LED light sources 22 supply a contribution to an auxiliary light distribution (such as daytime running lights), and at least one lens 21, wherein the lens 21 is a converging lens. Contrary to the lenses 13 of the light modules 10, the light must not be distributed to the sides with this light module, because this would destroy the asymmetry (at the light/dark line).

Figure 2:
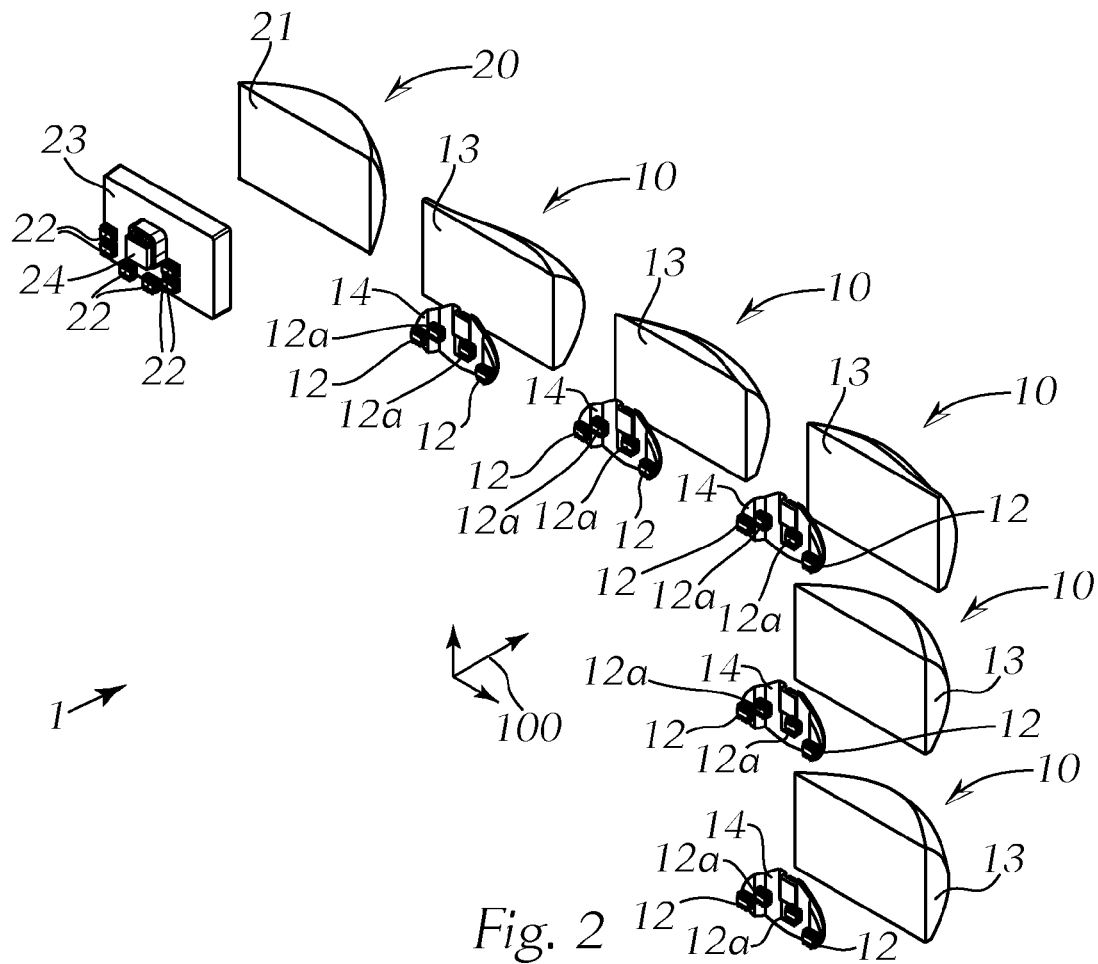
FIG. 2 shows a schematic oblique rear view of the headlight of FIG. 1.
Figure 3:
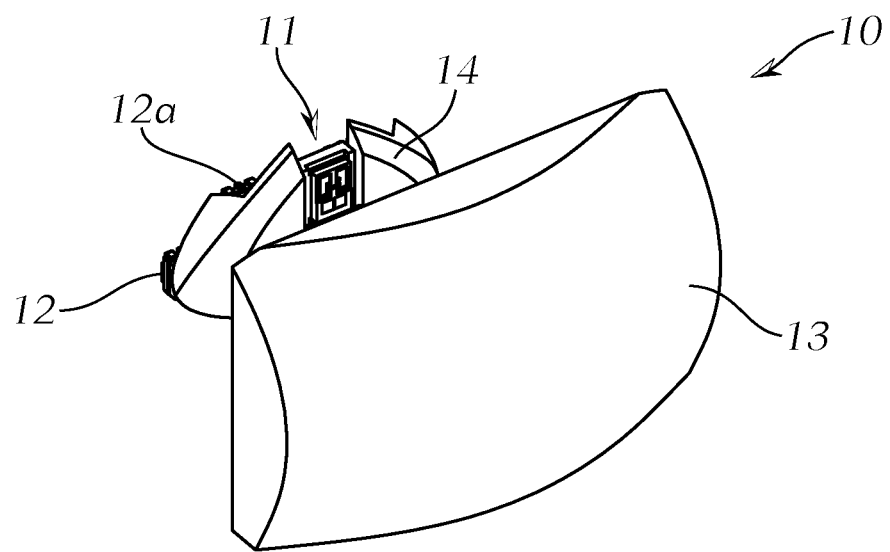
FIG. 3 shows an individual light module for use in a headlight according to the invention.
Figure 4:
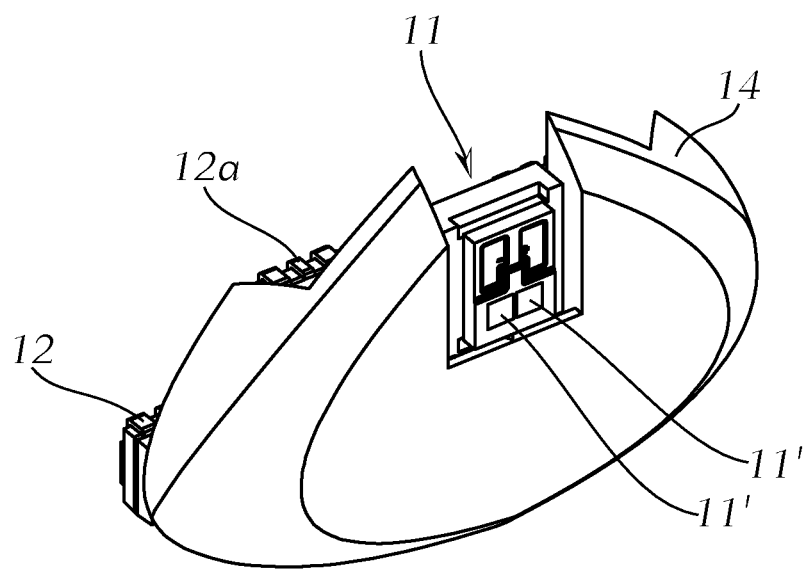
FIG. 4 shows a light module of FIG. 3 without lens.

So as to assure that, with such a headlight, the headlight has the same optical appearance both when the primary light function is activated and when the auxiliary light function is activated, which is say that all five light modules 10 are illuminated in every operating mode, according to the invention each of the LED light modules 10, as is apparent from FIG. 2 and in particular from FIGS. 3 and 4, comprises a primary LED light source 11, wherein the primary LED light source 11 in the example shown comprises two light-emitting diodes 11' (more particularly, 11' denotes the light exit areas of the light-emitting diodes), and further comprises four secondary LED light sources 12, 12a, wherein a secondary LED light source 12a, 12a comprises a light-emitting diode 12'.

In addition, the light module 20 is also preferably illuminated, which likewise comprises LED light sources 22 so as to produce a contribution to the auxiliary light distribution.

A lens 13 is arranged in the light exit direction in front of the LED light sources, wherein the light emitted by the primary LED light source 11 is radiated directly onto the lens 13 and projected from there into the exterior space, wherein the light emitted by the primary LED light sources 11 of all LED modules 10 forms the primary light distribution.

The light emitted by the secondary LED light sources 12, 12a of the LED module is radiated onto the lens 13 of the LED module 10 by way of an optical waveguide 14, the lens 13 projecting the light into the exterior space, and wherein the light emitted by the secondary LED light sources 12, 12a of all LED modules 10 forms the auxiliary light distribution.

Figure 5:
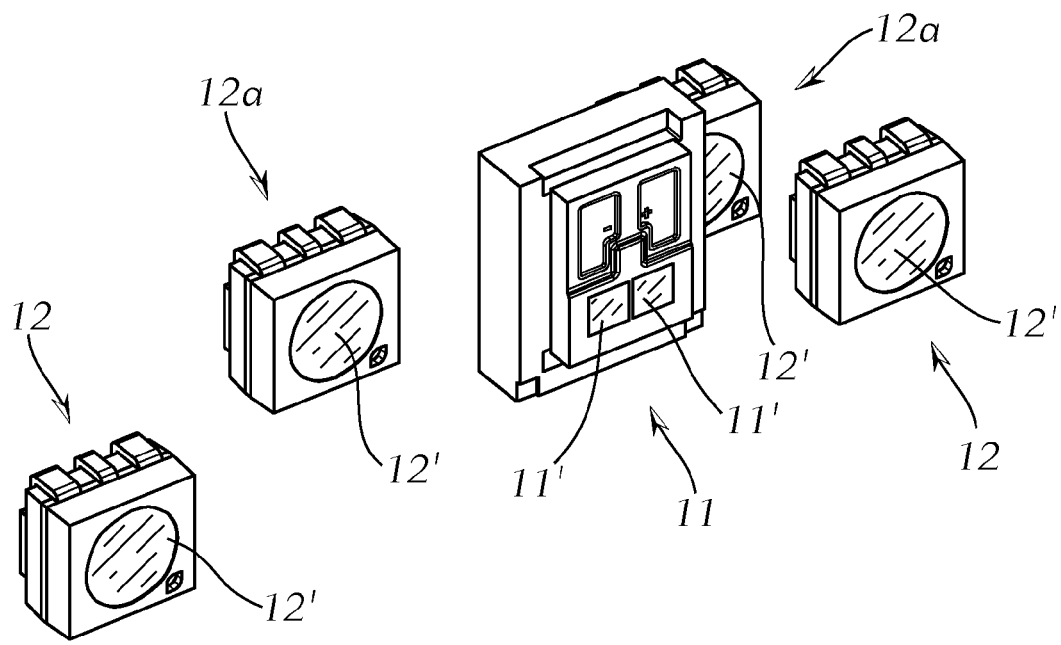
FIG. 5 shows the arrangement of the LED light sources behind the optical waveguide for a light module of FIG. 3.
Figure 7:
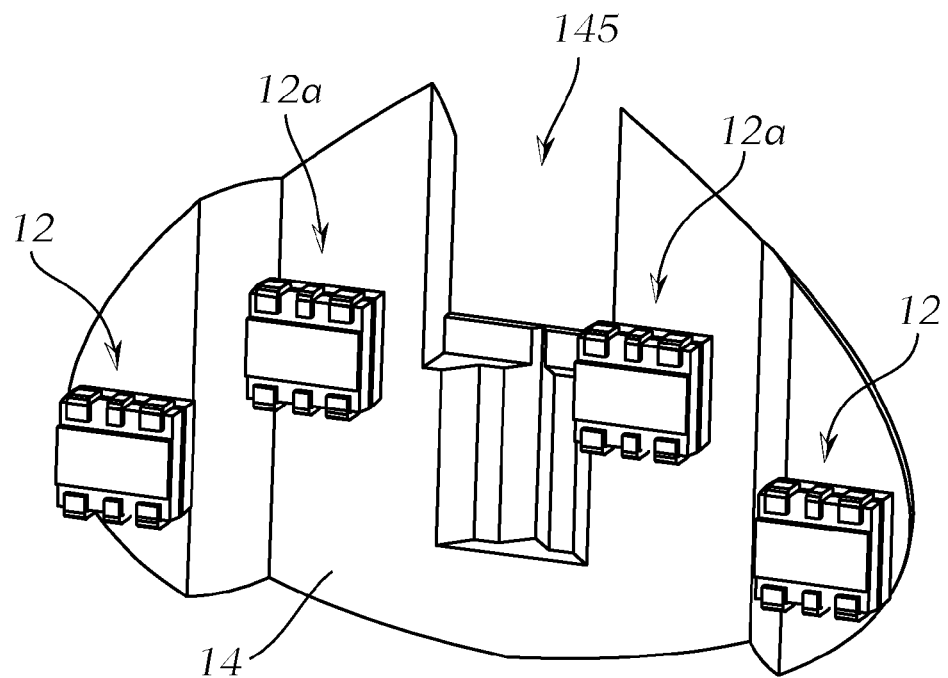
FIG. 7 shows the representation of FIG. 6 in an oblique rear view.

FIG. 5 shows such an arrangement of the LED light sources 11, 12, 12a, and FIG. 7 shows the arrangement of the secondary LED light sources 12, 12a relative to the optical waveguide 14.

Figure 10:
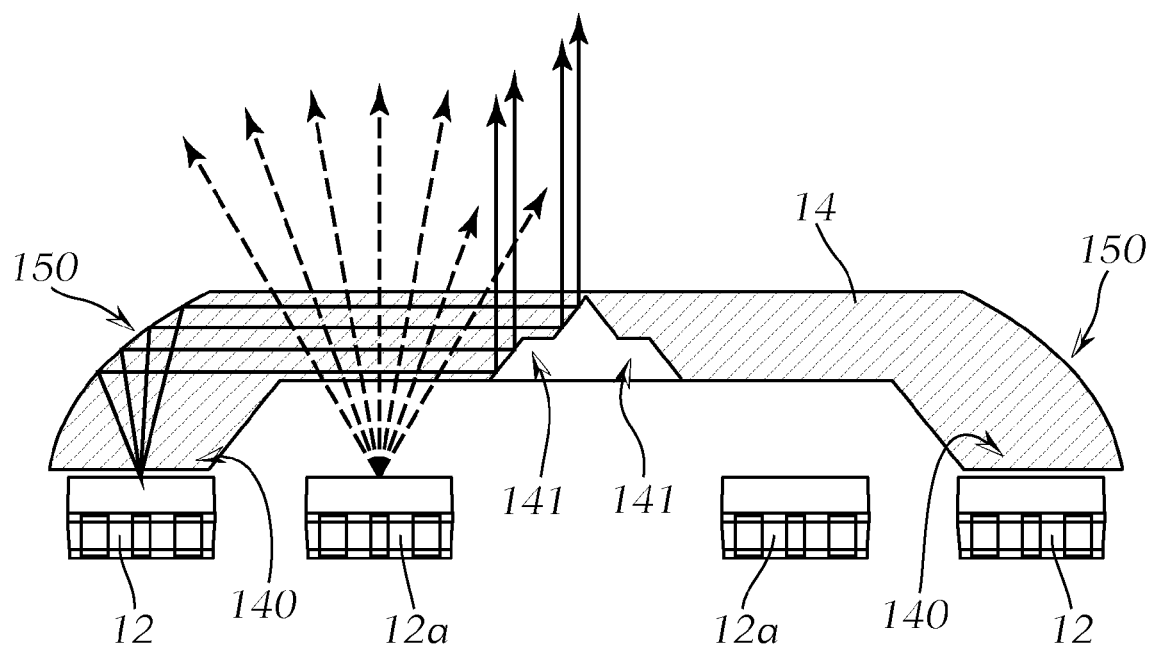
FIG. 10 shows a top view onto the sectional view of FIG. 9 and the beam path of the associated secondary LED light sources.

As is shown in FIG. 10, two of the secondary LED light sources 12a shine directly through the optical waveguide 14 so as to attain a homogeneous light distribution contribution to the auxiliary light distribution, and the two other secondary LED light sources 12 couple light into the optical waveguide 14 via a respective light incoupling point 140. The substantially parallel directed light exits the optical waveguide 14 again via two light outcoupling points 141 so as to produce a maximum contribution to the auxiliary light distribution.

The secondary LED light sources 12, 12a are located in a common vertical plane, which is to say the two inner light sources 12a are spaced from the optical waveguide 14, whereby the secondary LED light sources 12, 12a can be disposed on a common LED printed circuit board.

So as to be able to generate the light distributions by way of the lens 13 in an optically optimal manner, it is necessary for the light exit area 11' for the primary light function and that for the secondary light function to be located as close as possible to or in the focal plane of the lens or to extend in keeping with the field of curvature of the lens. Because of the design according to the invention, where the primary light is directly radiated onto the lens, while the secondary light is radiated via an optical waveguide, this design can be implemented in a simple manner.

Thus, all light modules can be switched on and illuminated both with the primary light function and the auxiliary light function, whereby the same appearance of the headlight is achieved for both functions.

The light outcoupling regions 141 are disposed in a central region of the optical waveguide 14, and more particularly these are located along a horizontal section through the optical waveguide 14—notably as seen looking in a direction transversely relative to the light exit direction—in the center of the horizontal section (see FIG. 10).

To this end, horizontal refers to the state in which the headlight is installed in the vehicle.

The light incoupling points 140 of the optical waveguide 14 are disposed in an outer region of the optical waveguide 14, and the secondary LED light sources 12a, the light of which passes directly through the optical waveguide 14, are each disposed between the one light incoupling point 140 and a light outcoupling point 141.

In order to obtain sufficient light and/or have a light area that is illuminated as completely as possible, the primary LED light source 11 is operated in dimmed mode in the secondary light operation. So as to achieve a seamless transition in the light distribution of the auxiliary light toward the dimmed primary LED light source, those secondary LED light sources that shine directly through the optical waveguide are disposed adjacent or neighboring to the primary LED light source. For these to be disposed without difficulty at the desired points, the secondary LED light sources that produce the maximum in the light distribution of the auxiliary light are disposed outside, because the light thereof is conducted to the desired point through the optical waveguide anyhow.

The secondary LED light sources 12, 12a are distributed along the horizontal extension of the optical waveguide 14 and preferably they are disposed symmetrically relative to the light outcoupling points 14.

Figure 6:
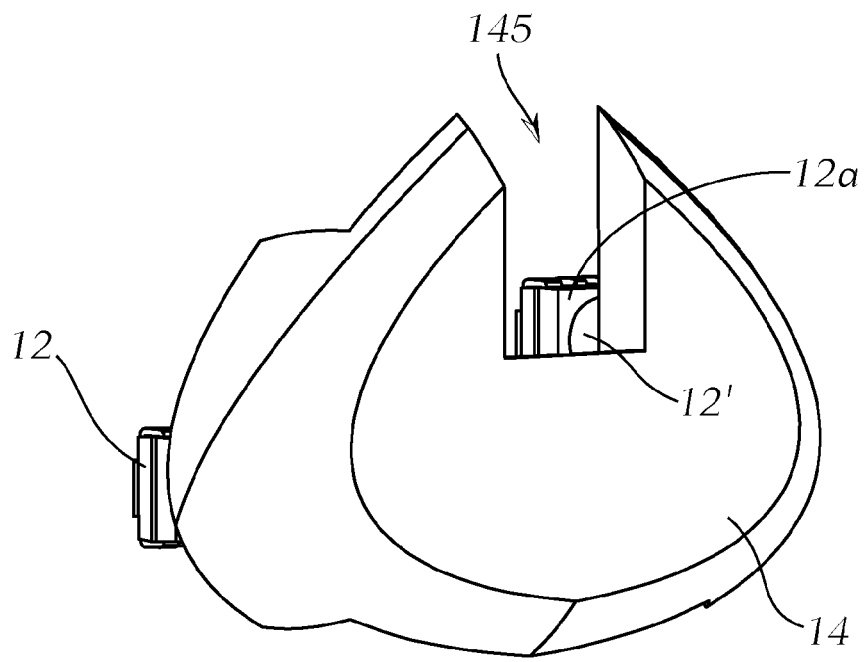
FIG. 6 is a representation as in FIG. 4, with the primary LED light source removed.
Figure 8:
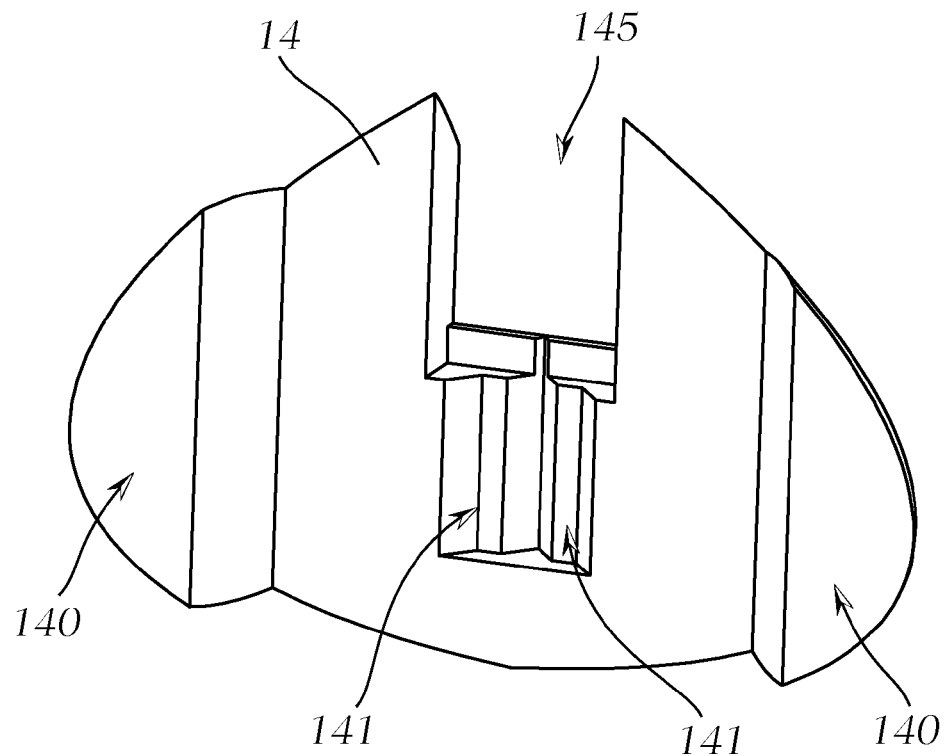
FIG. 8 shows an oblique rear view of the optical waveguide.

It is easily apparent from FIGS. 6 to 8 that additionally the optical waveguide 14 comprises an opening or cut-out 145 for light from the primary LED light source 11 to pass through, wherein the primary LED light source 11 is disposed in the cut-out 145.

The cut-out 145 and the primary LED light source are matched to each other with precise fit, so that the primary LED light source fits exactly in the cut-out 145, however the primary LED light source is typically not held or attached in the receptacle.

It is thus possible to provide all LED light sources, this being both the primary and the secondary LED light sources, on a common LED printed circuit board.

However, it may also be provided that only the secondary LED light sources are disposed on a common LED printed circuit board.

In addition, the light distribution of the primary light function is basically not affected by the optical waveguide.

Finally, it is thus also possible to attach the primary LED light source 11 in or close to the focal point of the lens 13 so as to optimally create the primary light distribution.

To this end, the primary LED light source 11 is disposed in the cut-out 145 such that the light exit areas 11' of the primary LED light source and the light exit area of the optical waveguide 14 are located substantially in a common plane.

Figure 9:
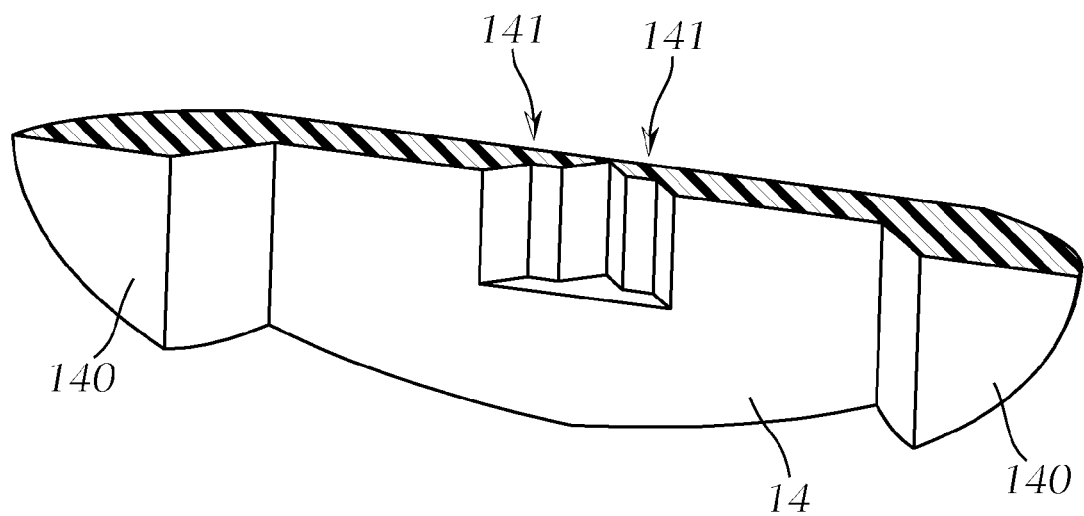
FIG. 9 is a horizontal sectional view of the optical waveguide according to FIG. 8.
Figure 11:
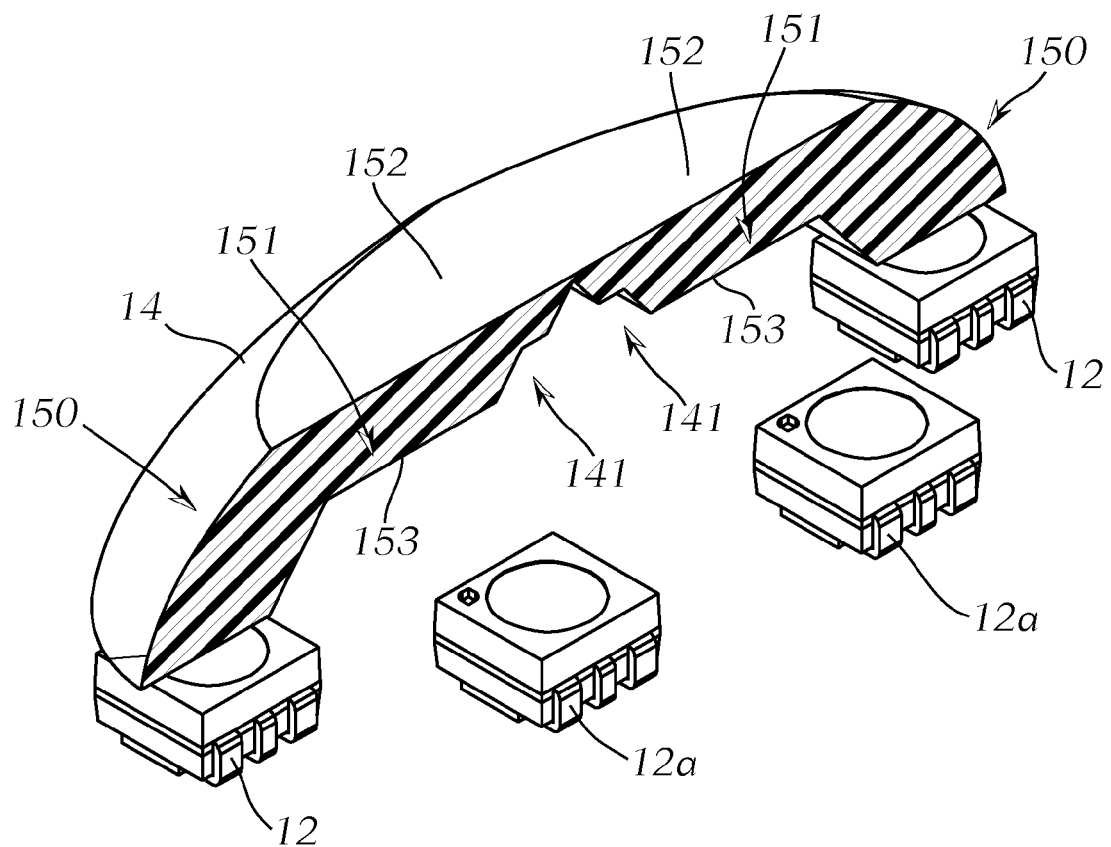
FIG. 11 is an isometric view of the representation of FIG. 10.

Looking at FIGS. 9 to 11, and FIG. 10 in particular, it is apparent that the optical waveguide 14 has a curved, for example parabolically shaped, section 150 adjacent to a light incoupling point 140, this section assuring the parallel direction of the coupled-in beams of the secondary LED light source 12.

The optical waveguide 14 can be designed to be reflective in the region of the curved section 150, either in some areas or over the entire curved section 150.

This is done to increase the efficiency, which is to say losses of light can thus be reduced or entirely prevented. A reflective layer is applied (from the outside) to the second by vapor deposition, for example.

An optical waveguide connecting section 151 is provided adjacent to such a curved section 150 of the optical waveguide 14, this connecting section connecting the curved optical waveguide section 150 to the optical waveguide outcoupling region 141, wherein the optical waveguide connecting section 151 comprises a delimiting surface 152 that faces away from the secondary LED light sources 12a, the delimiting plane 152 having a planar design in the example shown.

The delimiting surface 152 facing away forms the light exit area of the optical waveguide, the area preferably extending through the focal point of the lens 13.

This way, an illuminated area of the secondary LED light sources is attained.

Contrary to the representation in the figures, this light exit area 152 may advantageously also be curved, wherein the curvature then preferably follows the field of curvature of the lens. In the case of a planar light exit area, the light of the secondary LED light sources passing directly through the optical waveguide will no longer be located entirely in the focal surface or focal line of the lens, and is therefore imaged with slight distortion. However, this plays a subordinate role in the auxiliary light function because the light function does not have a pronounced light-dark line, but primarily has to supply the quantity of light at the measurement points and has to be homogeneous.

The primary LED light source can be disposed in the cut-out so that the light exit plane thereof is located in the plane of the outer planar or curved delimiting surface of the optical waveguide, wherein the primary LED light source, in particular the one light exit areas thereof, is located as exactly as possible in the focal point of the lens.

The delimiting surface 153 of the optical waveguide 14 facing the secondary LED light sources 12a is, as shown, preferably planar, and the delimiting surface 153 of the optical waveguide 14 facing the secondary LED light sources 12a and the delimiting surface 152 facing away from the secondary LED light sources 12a preferably extend parallel to each other.

As is also shown in FIG. 10, the light outcoupling points 141 are designed so that light from the optical waveguide connecting section 151 is refracted substantially normal relative to the light from the optical waveguide connecting section 151, for which purpose the light outcoupling points 141 are designed in a stepped or prism shape, for example.

The parallel direction of the beams is achieved by the curved, preferably parabolic, section or sections.

So as to be able to implement the vertical extension of the light from the auxiliary light in the manner required by law, additionally the light exit area 152 of the optical waveguide 14 has a defined extent, especially in terms of the vertical extension thereof, preferably differing defined vertical extensions at differing horizontal points. This is easily apparent from FIG. 6, for example.

In summary, this means that the light exit area, notably in the vertical direction, has a vertical extension (which may vary along the horizontal extension), so that the necessary extension of the light pattern (of the auxiliary light distribution as a superposition of the light distributions of the individual light modules 10) can be achieved in the vertical direction.

The light exit area is preferably mirror-symmetrical about a vertical axis for this purpose, so as to attain symmetrical light distribution in the horizontal direction.

The lenses 13 of the individual light modules 10 are designed for this purpose such that the superposed light patterns of the individual light modules 10 produce the primary light function and/or the auxiliary light function.

To this end, the main focus is typically directed to assuring that the primary light function is optimally created, wherein the general condition is that, of course, the primary and auxiliary light functions must satisfy legal requirements.

The lenses 13 are preferably free-form lenses, these free-form lenses preferably expanding the light pattern of the individual LED light sources downward and in terms of breadth (this applies both to the light of the primary light distribution and to that of the secondary light distribution).

So as to achieve symmetrical illumination of the optical waveguide, preferably those secondary LED light sources, the light of which passes directly through the optical waveguide, are located in a common horizontal plane, and those secondary LED light sources that couple light into the optical waveguide via at least one light incoupling point are likewise located in a common horizontal plane, wherein the horizontal plane of those secondary LED light sources, the light of which passes directly through the optical waveguide, is preferably located above the horizontal plane of those secondary LED light sources that couple light into the optical waveguide via at least one light incoupling point.

The primary LED light sources 11 are typically dimmed when the daytime running light is activated. Dimming has the advantage that an area is attained that is consistently illuminated and not dark in the region of the cut-out.

In addition, the primary LED light source is switched on and the secondary LED light source(s) are switched off when the low-beam light distribution is activated.

Figure 12:
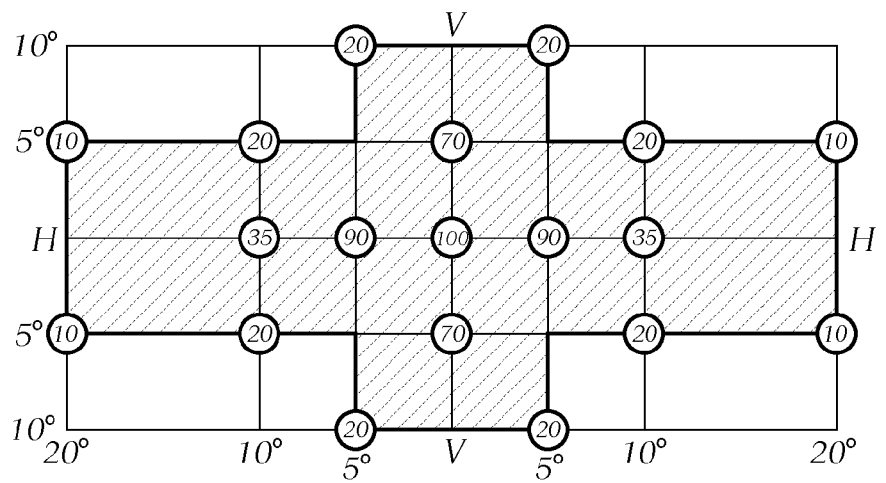
FIG. 12 is a daytime running lights (DRL) light distribution as required by law.

FIG. 12 shows a daytime running lights (DRL) light distribution required by law, which has a maximum at the center, at HV.

This is not a completely homogeneously distributed light distribution, rather the light is concentrated at the center, extending toward the sides.

Figure 13A:
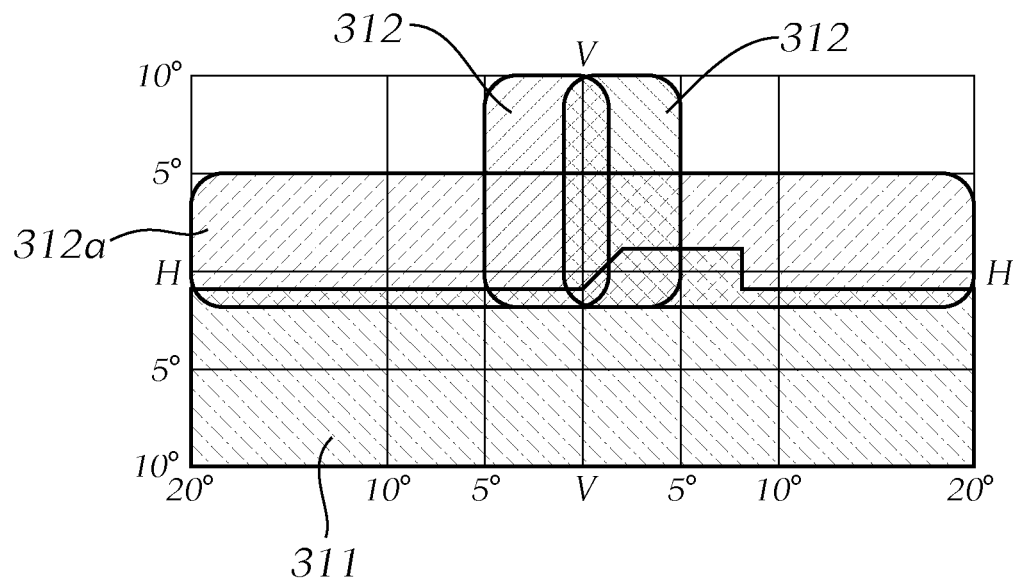
FIG. 13a is a daytime running lights light distribution, composed of a plurality of individual light distributions of individual light modules comprising free-form lenses according to an exemplary headlight of FIG. 1.
Figure 13B:
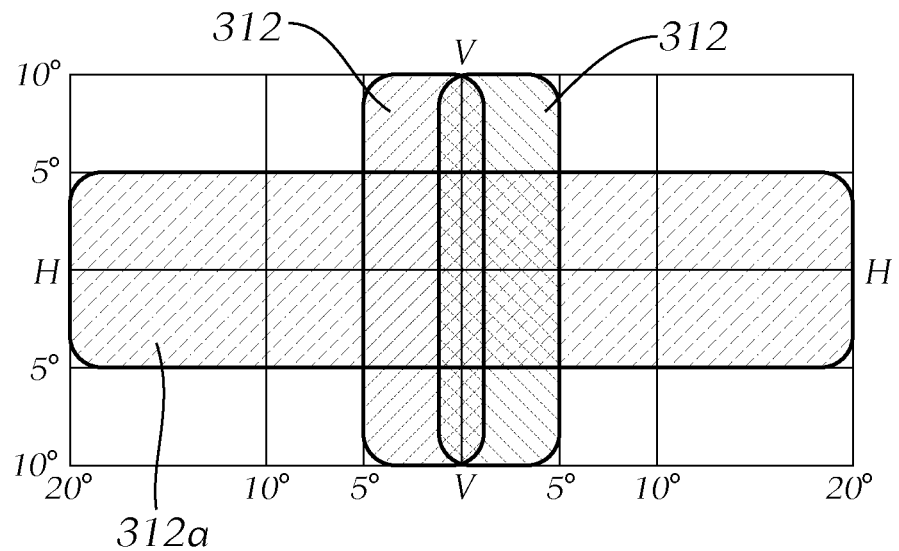
FIG. 13b shows another exemplary auxiliary light distribution.

FIG. 13a and FIG. 13b show a daytime running lights light distribution composed of several individual light distributions of individual light modules comprising free-form lenses.

Each module 10 supplies a component to the auxiliary light (daytime running lights) light distribution as shown in FIGS. 13a and 13b, wherein the individual light distributions differ slightly from each other by differently shaped lenses 13. These light patterns then create the required light values when superimposed. The light distribution created by the LED light sources 12, 12a are denoted by 312, 312a in FIGS. 13a and 13b.

The light distribution of FIG. 13a corresponds to that which is created using light modules 10 discussed in the description, together with the light module 20. The light distributions 312 and 312a extend only as far beneath the light/dark line as is required for these to superpose the light distribution 311 of the dimmed primary LED light source.

The daytime running lights light distribution in the particular embodiment according to FIG. 13a would not be compliant with the law without the dimmed primary LED light source, because the amount of light emitted below the light/dark line is insufficient. This is because the secondary LED light sources 12, 12a are disposed below the focal line of the lens. The auxiliary light distribution only attains legal compliance as a result of the dimming of the primary LED light source.

The asymmetrical component in the light distribution of FIG. 13a is attained by the light module 20 with the LED light source 24. In addition, the light module 20 with the LED light sources 22 produces a contribution to the auxiliary light distribution.

FIG. 13b shows another embodiment, in which the secondary LED light sources and the curved sections of the optical waveguide of the light modules 10 are located at the level of the respective primary LED light source thereof.

At the same time, the prism-shaped light outcoupling regions of the optical waveguide of the light modules 10 must extend further upward so as to expand the light pattern downward (below the light/dark line). The light outcoupling regions thus must also be located at the level of and above the primary LED light source.

Neither the dimmed primary LED light source of the light module 10 nor the LED light source 24 of the light module 20 contribute to the light distribution of the secondary light for the light distribution shown in FIG. 13b, which may make the use of a more powerful secondary LED light source necessary.

However, it may also be provided that dimmed primary LED light sources still provide a contribution to the light distribution shown in FIG. 13b.

Figure 14A:
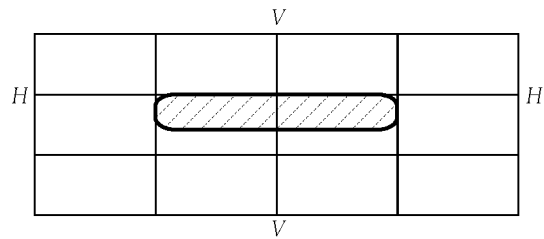
FIGS. 14a to 14d show various individual light distributions of an exemplary primary light distribution, created by light modules comprising free-form lenses.
Figure 14B:
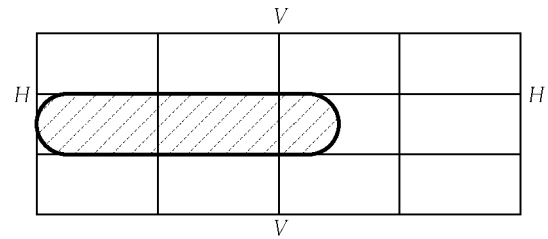
Figure 14C:
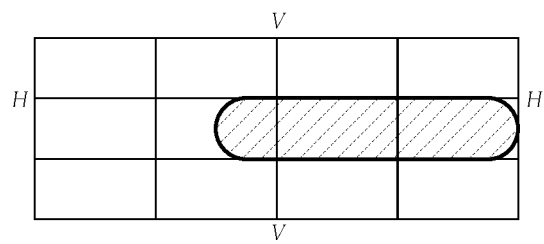
Figure 14D:
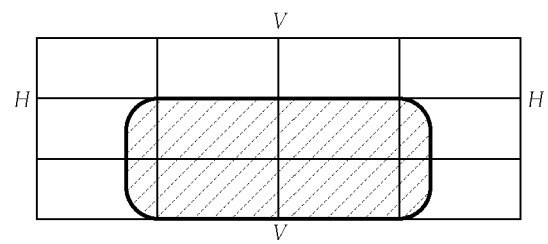
Figure 14E:
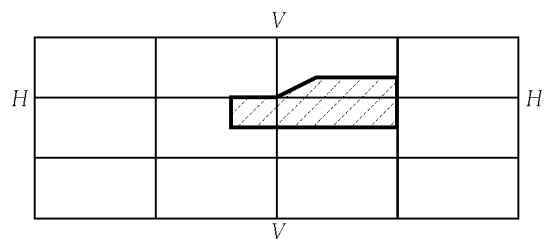
FIG. 14e is an individual light distribution of an asymmetrical light module.
Figure 14F:
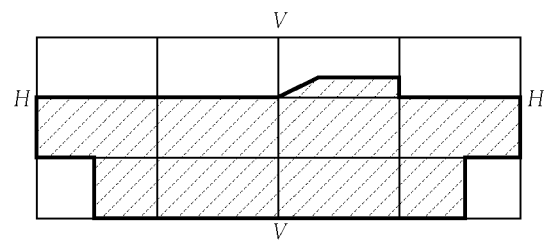
FIG. 14f is a superposition of the individual light patterns of FIGS. 14a to 14e.

FIG. 14f shows a low-beam light distribution. FIGS. 14a to 14d show a set of possible individual light distributions of individual light modules 10 comprising corresponding lenses 13, for example free-form lenses, as a contribution to this low-beam light distribution, wherein the composition of these modules 10 is identical in terms of the light sources, and the various light distributions are thus attained by the various lenses 13 and/or number and/or positions of the LEDs of the primary light distribution.

The light distribution of FIG. 14a achieves a high maximum of luminous flux at the light/dark line, the light distributions in FIG. 14b and FIG. 14c provide the necessary breadth, and the light distribution of FIG. 14d supplies a contribution to the far field of the low-beam light distribution. The asymmetrical light distribution of FIG. 14e is attained by using an additional lens module 20 (converging lens 21). In the exemplary asymmetrical module 20, the typical rise in the light pattern of the low-beam light distribution is created with a primary LED light source 24 in cooperation with a light tunnel as part of an optical element 23.

Superposition of the light distributions finally results in the low-beam light distribution of FIG. 14f.

In conclusion, it can be summarized that in an advantageous variant the

*) primary light distribution is formed by the primary LED light sources of the light modules 10 and 20; and

*) the auxiliary light distribution is formed by the secondary LED light source of the light modules 10 and 20 as well as by the dimmed primary LED light sources of the light modules 10 and 20, whereby in this variant all light modules are illuminated both with primary light and auxiliary light.

However, it may also be provided that the

*) primary light distribution is formed by the primary LED light sources of the light modules 10 and 20; and

*) the auxiliary light distribution is only provided by the secondary LED light source of the light modules 10 and 20, without dimmed primary LED light sources of the light modules 10 and 20.

In the latter case, the use of more powerful secondary LED light sources may be necessary for the light modules 10, and optionally also for the light module 20.

It may additionally be provided that, for example, the primary light distribution is created by all light modules 10, 20 and the auxiliary light distribution is created only by the light modules 10, wherein the primary LED light source may be dimmed or switched off.

The invention claimed is:

1. A vehicle headlight (1) for creating a primary light distribution and an auxiliary light distribution, wherein the vehicle headlight (1) comprises two or more LED light modules (10), wherein each of the LED light modules (10) comprises:
one or more primary LED light sources (11), wherein a primary LED light source (11) comprises at least one light-emitting diode (11');
two or more secondary LED light sources (12, 12a), wherein a secondary LED light source (12, 12a) comprises at least one light-emitting diode (12'); and
a lens (13);
wherein the light emitted by the at least one primary LED light source (11) is radiated directly onto the lens (13) and projected from there into the exterior space, wherein the light emitted by the primary LED light sources (11) of all LED modules (10) forms the primary light distribution,
wherein the optical waveguide (14) comprises at least one opening or cut-out (145) for light from the at least one primary LED light source (11) to pass through,
wherein the at least one primary LED light source (11) is disposed in the opening or cut-out (145); and
wherein the light emitted by the secondary LED light sources (12, 12a) of an LED module (10) is radiated onto the lens (13) of the LED module (10) by way of an optical waveguide (14), the lens (13) projecting the light into the exterior space, and
wherein the light emitted by the secondary LED light sources (12, 12a) of all LED modules (10) forms the auxiliary light distribution;
wherein light emitted by at least one of the secondary LED light sources (12) is coupled into the optical waveguide (14) via at least one light incoupling point (140) and exits from the optical waveguide (14) via at least one light outcoupling point (141) so as to produce a maximum contribution to the auxiliary light distribution,
wherein at least one of the secondary LED light sources (12a) shines directly through the optical waveguide (14).

2. The vehicle headlight according to claim 1, characterized in that the at least one light outcoupling point (141) is disposed in a central region of the optical waveguide (14).

3. The vehicle headlight according to claim 2, characterized in that the at least one light outcoupling point (141) is located along a horizontal section through the optical waveguide (14) at the center of the horizontal section.

4. The vehicle headlight according to claim 1, characterized in that the at least one light incoupling point (140) of the optical waveguide (14) for coupling in light of the at least one secondary LED light source (12) is disposed in an outer region of the optical waveguide (14).

5. The vehicle headlight according to claim 4, characterized in that the at least one secondary LED light source (12a), the light of which passes directly through the optical waveguide (14), is disposed between the at least one light incoupling point (140) and the at least one light outcoupling point (141).

6. The vehicle headlight according to claim 1, characterized in that exactly two, or at least two, secondary LED light sources (12a) are provided for each light module (10), the light of these LED light sources passing directly through the optical waveguide (14), and exactly two, or at least two, secondary LED light sources (12) are provided, which couple light into the optical waveguide (14) via at least one light incoupling point (140) or via a number that corresponds to the number of secondary LED light sources (12).

7. The vehicle headlight according to claim 6, characterized in that the secondary LED light sources (12, 12a) are distributed along the horizontal extension of the optical waveguide (14).

8. The vehicle headlight according to claim 1, characterized by exactly one primary LED light source (11) per LED light module (10).

9. The vehicle headlight according to claim 1, characterized in that the optical waveguide (14) has a curved section (150) adjacent to a light incoupling point (140), this section assuring the parallel direction of the coupled-in beams of the at least one secondary LED light source (12).

10. The vehicle headlight according to claim 9, characterized in that the optical waveguide (14) is designed to be reflective in the region of the curved section (150), either in some areas or in the entire curved section (150).

11. The vehicle headlight according to claim 9, characterized in that an optical waveguide connecting section (151) is provided adjacent to a curved section (150) of the optical waveguide (14), this connecting section connecting the curved optical waveguide section (150) to the optical waveguide outcoupling point (141), wherein the optical waveguide connecting section (151) comprises a delimiting surface (152) that faces away from the secondary LED light sources (12a), the delimiting surface (152) having a planar or curved shape.

12. The vehicle headlight according to claim 11, characterized in that the delimiting surface (153) of the optical waveguide (14) facing the secondary LED light sources (12a) is planar or curved.

13. The vehicle headlight according to claim 12, characterized in that the delimiting surface (153) of the optical waveguide (14) facing the secondary LED light sources (12a) and the delimiting surface (152) facing away from the secondary LED light sources (12a) extend parallel to each other.

14. The vehicle headlight according to claim 1, characterized in that the at least one light outcoupling point (141) is designed so that light from the optical waveguide connecting section (151) is refracted substantially normal relative to the light from the optical waveguide connecting section (151).

15. The vehicle headlight according to claim 1, characterized in that the light exit area (152) of the optical waveguide (14) has a defined extent in terms of the vertical extension thereof.

16. The vehicle headlight according to claim 1, characterized in that the lenses (13) of the individual light modules (10) are designed so that the superposed light patterns of the individual light modules (10) result in the primary light function and/or the auxiliary light function.

17. The vehicle headlight according to claim 16, characterized in that the lenses (13) are free-form lenses.

18. The vehicle headlight according to claim 1, characterized in that those secondary LED light sources (12a), the light of which passes directly through the optical waveguide (14), are located in a common horizontal plane, and that those secondary LED light sources (12) that couple light into the optical waveguide (14) via at least one light incoupling point (140) are likewise located in a common horizontal plane.

19. The vehicle headlight according to claim 18, characterized in that the horizontal plane of those secondary LED light sources (12a), the light of which passes directly through the optical waveguide (14), is located above the horizontal plane of those secondary LED light sources (12) that couple light into the optical waveguide (14) via at least one light incoupling point (140).

20. The vehicle headlight according to claim 1, characterized in that at least one further light module (20) is provided so as to create an asymmetrical component in the primary light distribution.

21. The vehicle headlight according to claim 20, characterized in that the at least one further light module (20) comprises at least one LED light source (22) and at least one lens (21).

22. The vehicle headlight according to claim 21, characterized in that the lens (21) is a converging lens.

23. The vehicle headlight according to claim 1, characterized in that the primary LED light sources (11) are dimmed or switched off when the auxiliary light distribution is activated.

24. The vehicle headlight according to claim 1, characterized in that the primary LED light source is switched on and the secondary LED light source is switched off when the primary light distribution is activated.

25. The vehicle headlight according to claim 1, characterized in that the primary light distribution is a dimmed light distribution, for example a low-beam light distribution, fog light or highway light.

26. The vehicle headlight according to claim 1, characterized in that the auxiliary light distribution is a daytime running light distribution.

27. The vehicle headlight according to claim 6, wherein the light is coupled into the optical waveguide (14) via exactly two light incoupling points (140).

28. The vehicle headlight according to claim 7, wherein the secondary LED light sources (12, 12a) distributed along the horizontal extension of the optical waveguide (14)-are disposed symmetrically relative to the at least one light outcoupling point (141).

29. The vehicle headlight according to claim 9, wherein the optical waveguide (14) has a parabolically shaped section (150) adjacent to a light incoupling point (140).

30. The vehicle headlight according to claim 11, wherein the delimiting surface (152) has a curvature is adapted to the field of curvature of the lens (13).

31. The vehicle headlight according to claim 14, wherein the at least one light outcoupling point (141) is designed in a stepped or prism shape.

32. The vehicle headlight according to claim 15, wherein the light exit area (152) of the optical waveguide (14) has differing defined vertical extensions at differing horizontal points.

33. The vehicle headlight according to claim 17, wherein the free-form lenses expand the light pattern of the individual LED light sources downward, in terms of breadth.

* * * * *